United States Patent [19]

Muth

[11] Patent Number: 5,058,507
[45] Date of Patent: Oct. 22, 1991

[54] CARRIAGE DRIVE FOR MOBILE STORAGE SYSTEM WITH DRIVE CHAIN TENSIONER

[75] Inventor: James C. Muth, Eagle, Wis.

[73] Assignee: Spacesaver Corporation, Fort Atkinson, Wis.

[21] Appl. No.: 484,830

[22] Filed: Feb. 26, 1990

[51] Int. Cl.⁵ .............................................. B61C 9/00
[52] U.S. Cl. .................................. 105/105; 105/108; 16/46; 474/136
[58] Field of Search ............. 105/96, 105, 108, 218.1; 16/46; 474/111, 113, 114, 136, 140; 312/198, 201

[56] References Cited

U.S. PATENT DOCUMENTS

| | | | |
|---|---|---|---|
| 866,702 | 9/1907 | Weeks | 474/111 X |
| 2,121,080 | 6/1938 | Galkin | 474/136 |
| 2,723,566 | 11/1955 | Hyman | 474/111 |
| 3,422,692 | 1/1969 | Woodring | 474/136 |
| 3,923,354 | 12/1975 | Young | 312/198 X |
| 4,017,131 | 4/1977 | Camenisch | 312/201 X |
| 4,123,126 | 10/1978 | Querengasser | 312/201 |
| 4,421,365 | 12/1983 | Taniwaki | 105/89 X |
| 4,559,027 | 12/1985 | Sattel | 474/116 |
| 4,616,888 | 10/1986 | Peterman | 312/201 |
| 4,693,418 | 9/1987 | Peterman | 238/10 R |

Primary Examiner—M. C. Graham
Assistant Examiner—S. Joseph Morano
Attorney, Agent, or Firm—Fuller, Ryan & Hohenfeldt

[57] ABSTRACT

A carriage for a mobile storage system, including a frame having an inverted U-shaped cross section, including two downwardly depending sides extending the length of the frame. A drive shaft is journaled to the frame and rotated by a prime mover. A drive wheel affixed to the drive shaft rotates with it. A driven shaft, journaled to the frame and oriented parallel to the drive shaft, carries a driven wheel within the frame, for moving the carriage along the rails. A drive chain or belt is provided for transmitting power from the drive wheel, via the driven shaft, to the driven wheel. The driven shaft is journaled to the frame by means of flangette bearings, each bearing affixed to a respective offset mounting bracket. Each bracket is affixed to one of the frame sides, there being insufficient clearance between the driven wheel and the frame sides for the placement of the flangette bearings. The tension of the drive chain or belt is adjusted by a tensioning bracket slidably connected to the frame, permitting sliding movement of the tensioning bracket transverse to the drive chain or belt. A tensioning block is affixed to the bracket, and a bolt is threaded to the frame for sliding the tensioning block toward and away from the drive chain or belt.

4 Claims, 3 Drawing Sheets

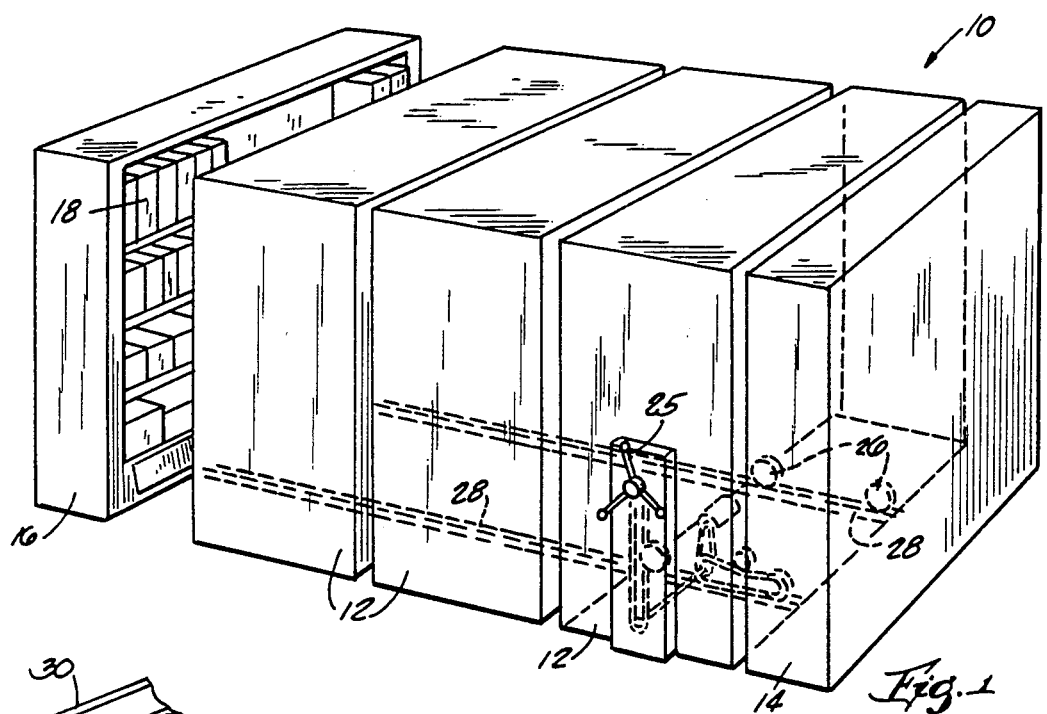
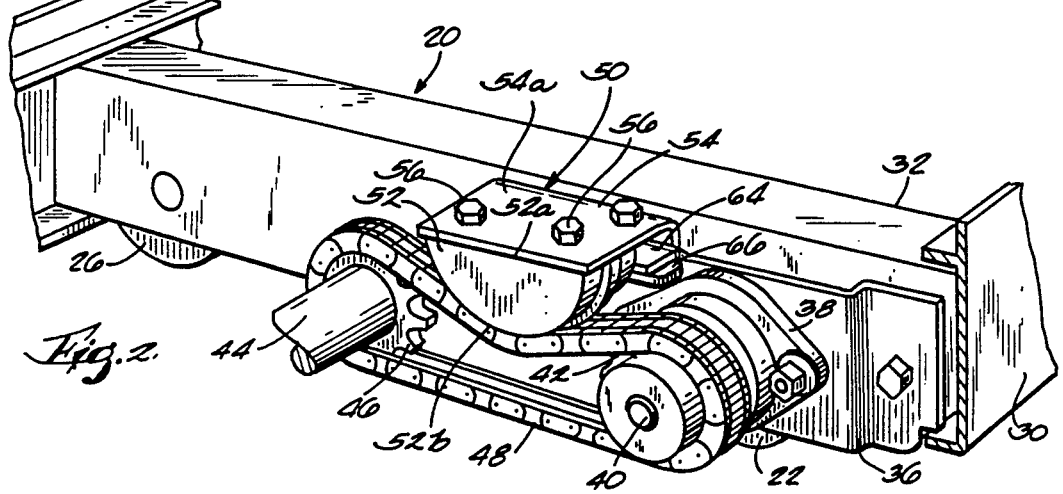
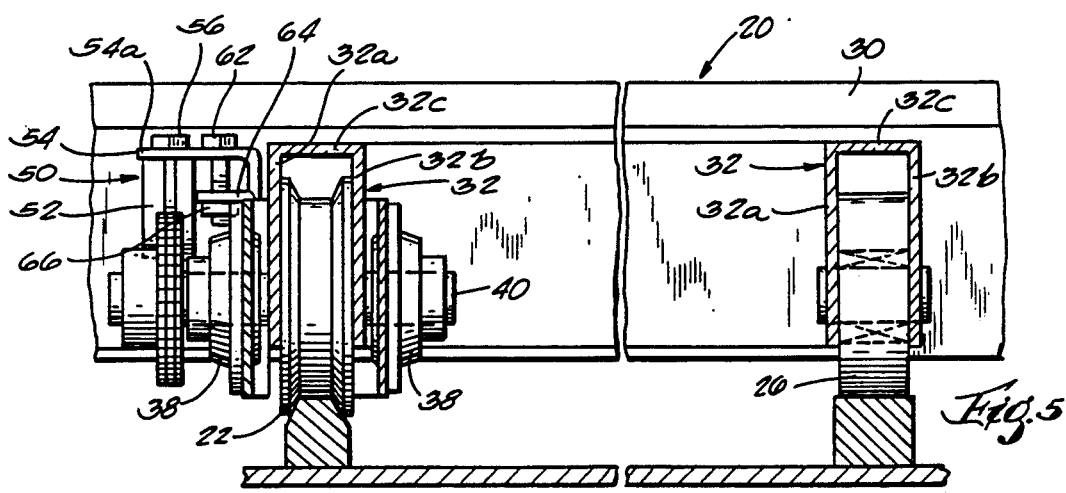

5,058,507

CARRIAGE DRIVE FOR MOBILE STORAGE SYSTEM WITH DRIVE CHAIN TENSIONER

BACKGROUND OF THE INVENTION

This invention relates to mobile storage systems, and in particular to means for driving the mobile storage units of a system along a track set on a building floor.

Mobile storage systems comprise a series of storage units which have shelves or bins, for example. Each of the storage units is movable on tracks to create an access aisle between two of the units and to establish the others in close side-by-side relationship to minimize the amount of floor space required for the units. Especially in larger mobile storage units and systems, the carriages are quite large, and there is no real problem with space within the carriages for drives and drive units. In smaller systems, however, space for these carriages can be a problem, particularly vertical space or headroom within the carriage and below the lowest shelf within the storage unit. Since space was never a problem in the larger units, pillow block bearings were always used to journal the drive shaft and the driven shaft, because of their relative ease of installation. Since space becomes a problem in the smaller units, however, pillow blocks are inappropriate for use in them. An idea of the amount of room required to accommodate the pillow block bearings, including associated attachment means, can be obtained by reference to Peterman, U.S. Pat. No. 4,618,191. Clearly, a different means of journaling the shafts is needed. Also, pillow block bearings can be too expensive for use in lower capacity units.

In addition, a chain drive is one way to reduce the need for headroom in a carriage. Such a drive requires, however, the ability to apply and adjust tension to the drive chain. With access to any tensioner limited, it would be best if the necessity of access were limited, that is, if it were easy to adjust the tension and the tension did not require frequent adjustment.

This invention relates to improvements to the apparatus described above and to solutions to the problems raised thereby.

SUMMARY OF THE INVENTION

The invention relates to a carriage for a mobile storage system. Such a storage system normally includes rails embedded in a building floor, with the carriage moving the storage units comprising the system back and forth on the rails. According to the invention, each carriage includes a frame member having an inverted U-shaped cross section. The frame thus has two downwardly depending sides which extend the length of the frame. A drive shaft is journaled to and generally centrally located in the frame, and rotated by a prime mover, such as an electric motor or mechanical assist handle. A drive wheel, such as a sprocket or pulley, is affixed to the drive shaft and rotates with it. A driven shaft is also journaled to the frame and oriented substantially parallel to the drive shaft. The driven shaft carries a driven wheel positioned within the frame, for moving the carriage along the rails. Means, such as a drive chain or belt, are provided for transmitting power from the drive wheel, via the driven shaft, to the driven wheel. The driven shaft is journaled to the frame member by means of flangette bearings, each such bearing being affixed to a respective offset bracket. Each respective offset bracket is affixed to a respective one of the frame sides, since there is insufficient clearance between the driven wheel and the frame sides for the placement of the flangette bearings. In the preferred embodiment a drive sprocket is affixed to the drive shaft and a driven sprocket affixed to the driven shaft. The two sprockets are substantially aligned, and connected by a drive chain. The invention further provides for tension adjusting means for adjusting tension in the drive chain. In the preferred embodiment this tension adjusting means includes a tensioning bracket slidably connected to the frame, alongside the frame and between the sprockets so as to permit sliding movement of the tensioning bracket relative to the frame in a direction transverse to the drive chain. A tensioning block is affixed to the bracket, and threaded means are threadedly connected to the frame and rotatably connected to the tensioning bracket for permitting controlled sliding movement of the tensioning block toward and away from the drive chain.

Other objects and advantages of the invention will become apparent hereinafter.

DESCRIPTION OF THE DRAWING

FIG. 1 an isometric view of a storage system constructed according to a preferred embodiment of the invention.

FIG. 2 is an isometric view of a carriage unit employed system shown in FIG. 1.

FIG. 5 is a cross sectional view of the carriage shown in FIG. 3, taken along line 5—5.

DESCRIPTION OF THE PREFERRED EMBODIMENT

Figure 3:
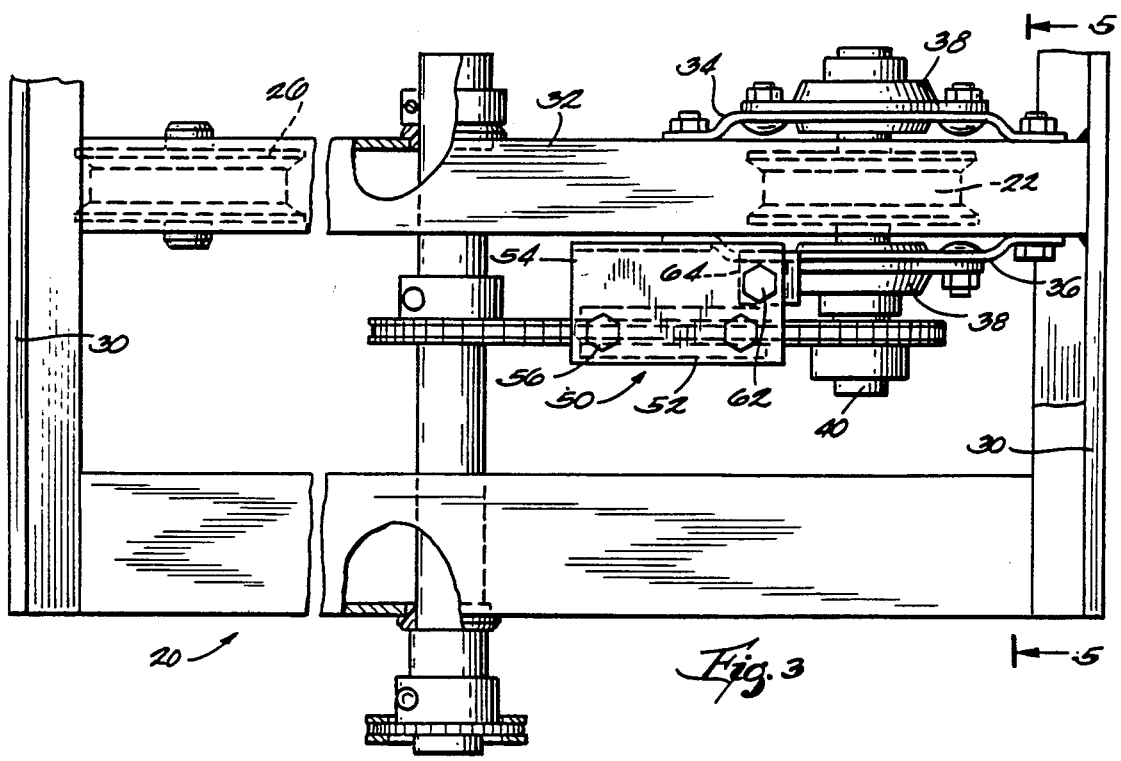
FIG. 3 is a top view, partially cut away, of the carriage shown in FIG. 2.
Figure 4:
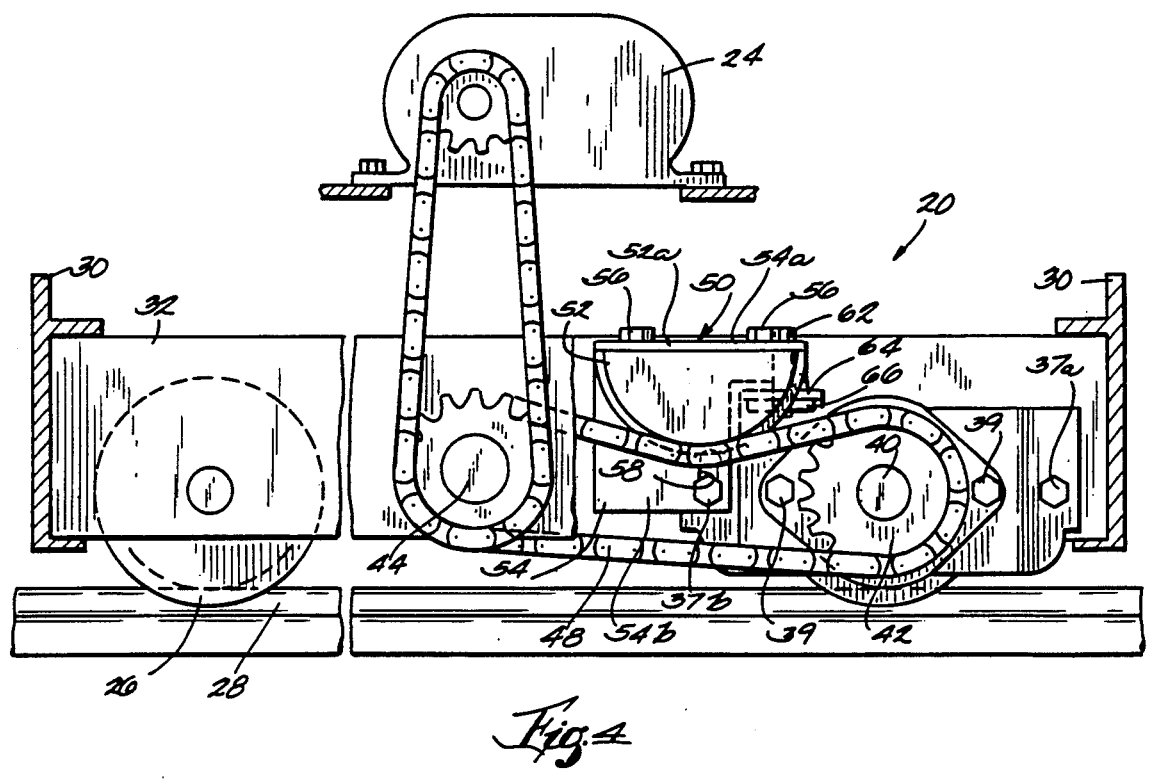
FIG. 4 is a front elevational view of the carriage shown in FIG. 2, including the showing of a prime mover.
Figure 6:
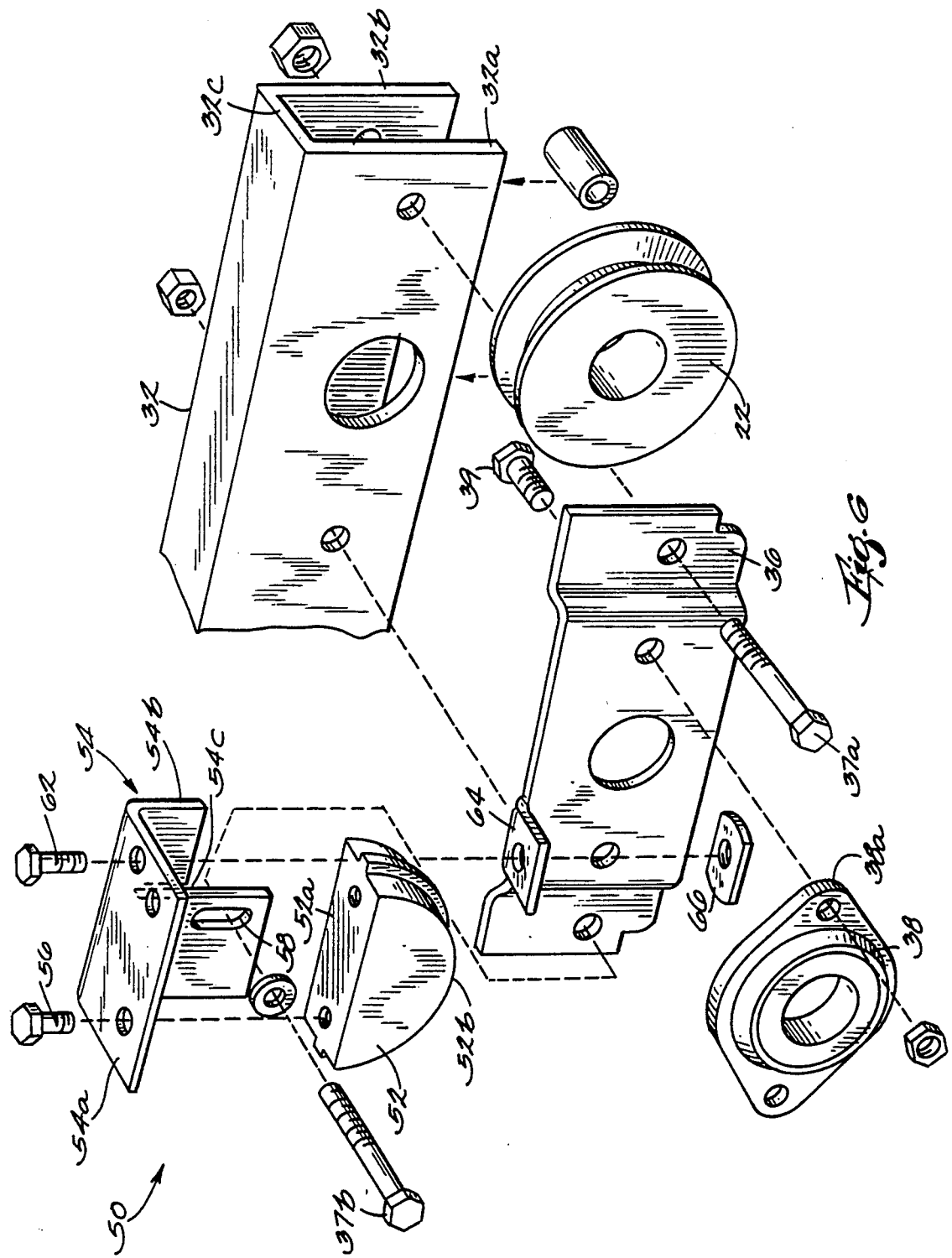
FIG. 6 is an exploded isometric view of a tensioning device employed in a preferred embodiment of the invention.

Referring now to FIG. 1, there is shown a storage system 10 including several mobile storage units 12 arranged to move alternately and selectively to the left and right as depicted to establish an access aisle between them as needed by a user. In some installations there may be a dozen or more of such units 12. The mobile storage units 12 move between a pair of stationary end storage units 14 and 16. As is well known, the storage units are commonly used to store various different items 18, such hardware, books and files for example. As is well known, each mobile storage unit 12 usually has four wheels 22 and 26, which run on tracks 28. These tracks 28 are often recessed in slots in the floor of the room in which the storage units are installed, or a modular floor may be built up above the existing floor so as to recess the tracks. As shown in FIG. 5, one of these tracks is usually flat while the other is usually beveled to permit use of flanged wheels thereon, for keeping the carriage aligned with and on the tracks.

According to the invention, each mobile storage unit 12 has a carriage 20, having generally four wheels. One wheel 22 is a driven wheel, driven by any suitable prime mover 24, such as a mechanical assist handle 25. The other three wheels 26 of the carriage 20 are idler wheels. The present invention is directed to a means for driving the driven wheel 22.

FIGS. 2 through 6 show an embodiment of a carriage, drive and tensioning assembly constructed according to a preferred embodiment of the invention. As shown in those drawing figures, the carriage 20 includes at least two longitudinal frame members 30 generally orthogonally associated with lateral frame members 32. As shown best in FIG. 5, the lateral frame members 32 are formed of two downwardly depending sides 32a and 32b, spaced apart and connected at their top ends by a flat top side 32c. Hence the lateral frame members have an inverted U-shaped cross section, generally with square corners. As indicated above, the carriage 20 has a number of wheels 22 and 26. In order to provide maximum support and stability, each of the wheels 22 and 26 is very nearly as wide as the spacing between the sides 32a and 32b.

Each of the wheels 22 and 26 is journaled between the respective sides 32a and 32b. Because wheels 26 are idler wheels, they may be journaled simply, by means of plain bearings or bushings. Since wheel 22 is the driven wheel, however, it requires extra bearing support, such as ball bearings or roller bearings. The space within the carriage 20, though, is so limited that the pillow block bearings normally used in this application would take up inordinate amounts of room, and would require the extra expense and labor of special mounting plates. Flangette bearings are less expensive and do not require the same mounting plates as pillow block bearings, but would normally mount between the wheel 22 and the frame sides 32a and 32b.

In the present invention, the space, labor and cost savings of flangette bearings are realized by use of offset mounting plates 34 and 36, shown best in FIG. 3. One offset mounting plate is provided for each flangette, attached to the outside surface of the respective frame side 32a or 32b by any suitable means such as bolts 37a and 37b. The separation between the two bolts 37a and 37b, and hence their bolt holes in the respective mounting plate, is sufficient to straddle the driven wheel 22. A flangette bearing 38 is in turn mounted to each mounting plate 34 or 36, positioned on the respective mounting plate opposite the respective frame side. Each bearing 38 is attached by any suitable means such as bolts 39, preferably inserted from behind the plate and passing through the flange 38a of the flangette bearing. By this means, the diameters of the flangette bearings 38 may be smaller than the diameter of the driven wheel 22, further reducing the cost of the assembly.

The inner race of each of bearings 38 is affixed to a driven shaft 40, which is in turn affixed to driven wheel 22. As indicated above, the driven wheel 22 is connected to a prime mover 24 (FIG. 4), such as a mechanical assist handle 25 (FIG. 1). This connection may be by any suitable drive means adjustable for wear, such as belt or chain. In the embodiment shown in the drawing figures, this connection is by means of a sprocket and chain arrangement. In particular, a driven sprocket 42 is affixed to driven shaft 40. Spaced apart from and substantially parallel to the driven shaft 40 is a drive shaft 44, also journaled to the frame member 32. Generally the drive shaft 44 will be centered in the length of the frame members 32. A drive sprocket 46, also referred to herein as a drive wheel, is affixed to drive shaft 44, and a drive chain or drive belt 48 connects drive sprocket 46 to driven sprocket 42.

The invention provides for tensioning means 50 for ensuring that the drive chain 48 is at the proper tension to efficiently transfer rotational motion from the drive sprocket 46 to the driven sprocket 42. In the embodiment shown, the tensioning means 50 includes a resilient tensioning block 52, of any suitable material, such as ultra-high molecular weight polyethylene. The shape of the tensioning block 52 may be any suitable space-efficient shape, considering the space limitations of the carriage 20. In the embodiment shown in FIGS. 2, 4 and 6, the block 52 is shaped in a semi-disk shape, with a flat side 52a facing upward and a semicircular shape 52b facing downward and bearing on the drive chain 48. The tensioning block 52 is held against the chain 48 by a tensioning bracket 54. The tensioning bracket 54 has an upper, nominally horizontal, overhanging portion 54a, to which the tensioning block 52 is attached by any suitable means such as bolts 56. Tensioning bracket 54 also has a downwardly projecting back plane portion 54b, which includes a slot 58 (FIGS. 4 and 6) formed therein and oriented nominally vertically. By means of back plane 54b and slot 58, the bracket 54 is attached to the frame 32 between the drive shaft 44 and the driven shaft 40 in a manner that permits sliding movement of the tensioning block toward and away from the drive chain 48. In particular, in the embodiment shown in FIGS. 4 and 6, the one mounting bolt 37b for mounting the mounting bracket 36 to the frame 32 is passed also through the slot 58 for this purpose.

The invention also provides for means for forcing or causing the sliding movement of the tensioning block 52 toward and away from the drive chain 48. In the embodiment shown, the sliding means includes an adjuster bolt 62 which passes through overhang 54a of the tensioning bracket and a tab 64 provided for that purpose attached to the adjacent frame side 32a. In the most preferred embodiment and to promote the most efficient use of parts, the tab 64 is formed integrally with, and as a nominally horizontal projection of, offset mounting plate 36, as shown best in FIGS. 2 and 6. A nut 66, preferably of a type which is sized and shaped so as to be prevented from turning just by its relative size, thus bearing on the face of bracket 36, is positioned beyond the tab 64 and threadedly receives the adjuster bolt 62. Alternatively, the nut 66 may be welded to the tab 64. For purposes of reduction of parts inventory, brackets 34 and 36 may be identical, both including the tab 64.

In the embodiment shown in FIG. 6, again for the purpose of promoting the most efficient use of space and parts, and still provide sufficient strength, the tensioning bracket 54 includes a split 54c, that is, a vertically oriented gap between two portions of the back plane 54b of the bracket, left portion 54d containing the slot 58 and right portion 54e. Upon assembly of the bracket 54 to the offset mounting bracket 36, then, left portion 54d fits over the mounting bracket 36, while right portion 54e fits behind the mounting bracket. This arrangement provides extra strength to the tensioning bracket 54, and uses no extra space.

Hence, with the mounting bolt 37b properly torqued, the adjuster bolt 62 may be turned to move the tensioning block 52 toward (and away from, if the nut 66 is welded to the tab 64, or if the tension in the opposite direction provided by the chain itself is sufficient) the drive chain 48, thereby adjusting the chain tension by accessing only one threaded fastener which is placed and positioned for easy access. The invention thus provides a carriage having a drive mechanism which makes extremely efficient use of space, and a tensioning means which is extremely easy to access and service efficiently.

While the apparatus hereinbefore described is effectively adapted to fulfill the aforesaid objects, it is to be understood that the invention is not intended to be limited to the specific preferred embodiment of carriage drive for mobile storage system set forth above. Rather, it is to be taken as including all reasonable equivalents within the scope of the following claims.

I claim:

1. A carriage for a mobile storage system including rails embedded in a building floor, said carriage comprising:
   a frame member, having two sides which run the length of the frame member;
   a drive shaft and a driven shaft, both journaled to said frame member and spaced apart from each other in substantially parallel relation, said drive shaft connected to a prime mover;
   a drive sprocket affixed to said drive shaft;
   a driven sprocket affixed to said driven shaft, substantially aligned with said drive sprocket and connected to said drive sprocket by a drive chain;
   at least one of said drive shaft and said driven shaft being journaled to said frame member by means of flangette bearings, each said bearing being affixed to a respective offset bracket, each respective offset bracket being affixed to a respective one of said sides of said frame by means of bracket bolts; and
   tensioning means for providing and adjusting tension in said drive chain, including:
      a tensioning bracket slidably connected to said offset bracket so as to permit sliding movement of said tensioning bracket relative to said frame member in a direction transverse to said drive chain;
      a resilient tensioning block affixed to said bracket and oriented so as to resiliently bear upon said drive chain; and
      a tension adjusting bolt rotatably connected to said tensioning bracket and threadedly connected to a tab protruding generally perpendicularly from said offset bracket for causing sliding movement of said tensioning means and thus said resilient means toward and away from said drive chain by turning said bolt;
      at least one of said bracket bolts passing through a slot in said tensioning bracket and thereby slidably connecting said tensioning bracket to said offset bracket.

2. A carriage as recited in claim 1 wherein said tensioning bracket includes a split, dividing said tensioning bracket into two portions, and wherein one of said portions is placed behind the offset bracket while the other of said portions is placed in front of the offset bracket.

3. A carriage for a mobile storage system including rails mounted to a building floor, said carriage comprising:
   a frame member, having an inverted U-shaped cross section, thus having two downwardly depending sides which run the length of the frame member;
   a drive shaft and a driven shaft, both journaled to said frame member and spaced apart from each other in substantially parallel relation, said drive shaft connected to a prime mover;
   at least one of said drive shaft and said driven shaft being journaled to said frame member by means of flangette bearings, each said bearing being affixed to a respective offset bracket, each respective offset bracket being affixed to a respective one of said sides of said frame by means of bracket bolts;
   a drive pulley affixed to said drive shaft;
   a driven pulley affixed to said driven shaft, substantially aligned with said drive pulley and connected to said drive pulley by a drive belt; and
   tensioning means for providing and adjusting tension in said drive belt, including:
      a tensioning bracket slidably connected to said offset bracket alongside said frame member and between said pulleys so as to permit sliding movement of said tensioning bracket relative to said frame member in a direction transverse to said drive belt;
      a resilient tensioning block affixed to said bracket and oriented so as to resiliently bear upon said drive belt; and
      a tension adjusting bolt rotatably connected to said tensioning bracket and threadedly connected to a tab protruding from and generally perpendicular to said offset bracket for causing sliding movement of said tensioning means and thus said resilient means towards and away from said drive belt by turning said tension adjusting bolt;
      at least one of said bracket bolts being fastened through a slot in said tensioning bracket and thereby slidably connecting said tensioning bracket to said offset bracket.

4. A carriage as recited in claim 3 wherein said tensioning bracket includes a split, dividing said tensioning bracket into two portions, and wherein one of said portions is placed behind the offset bracket while the other of said portions is placed in front of the offset bracket.

* * * * *